April 16, 1963  J. L. L. HOOD  3,086,145
ANTISTATIC TREATMENT OF FLEXIBLE TUBULAR FILMS
Filed May 25, 1960  2 Sheets-Sheet 1
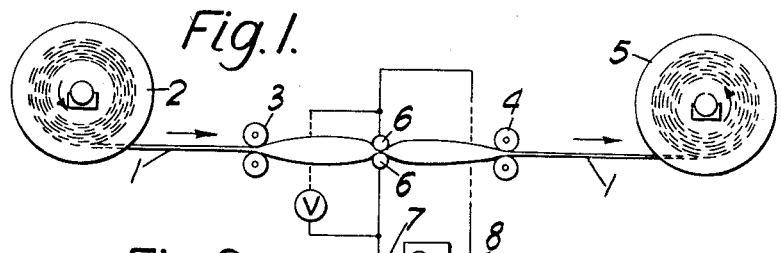
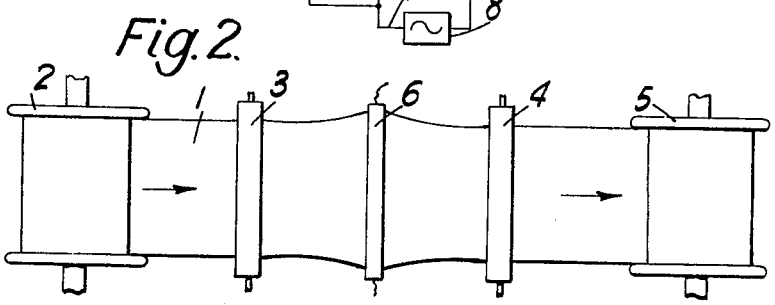
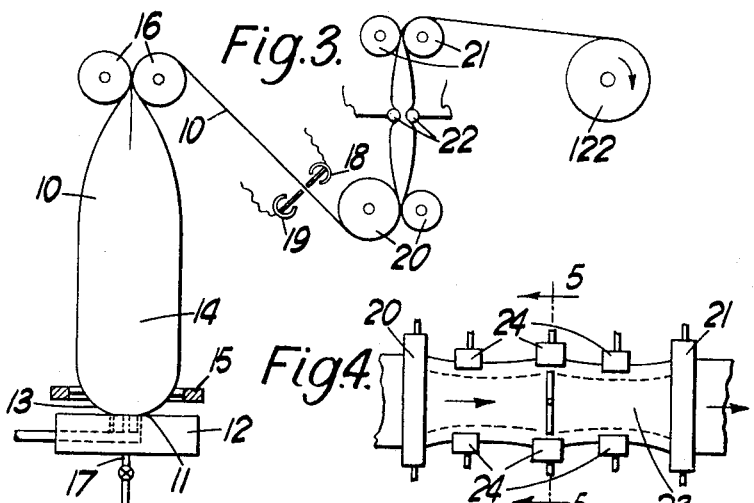
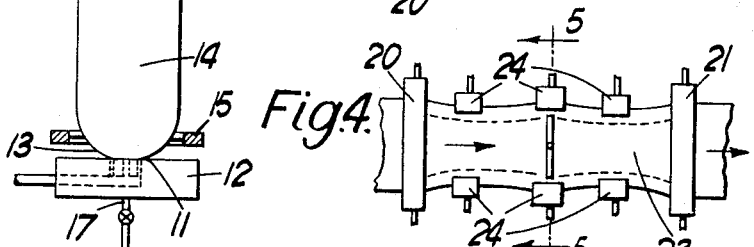
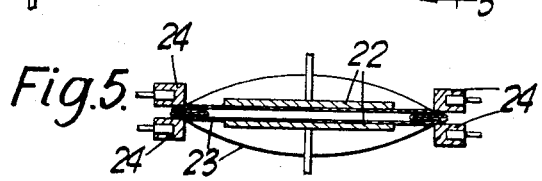
INVENTOR
John Laurence Lindley Hood
By Watson, Cole, Grindle & Watson
ATTORNEYS April 16, 1963 J. L. L. HOOD 3,086,145
ANTISTATIC TREATMENT OF FLEXIBLE TUBULAR FILMS
Filed May 25, 1960 2 Sheets-Sheet 2
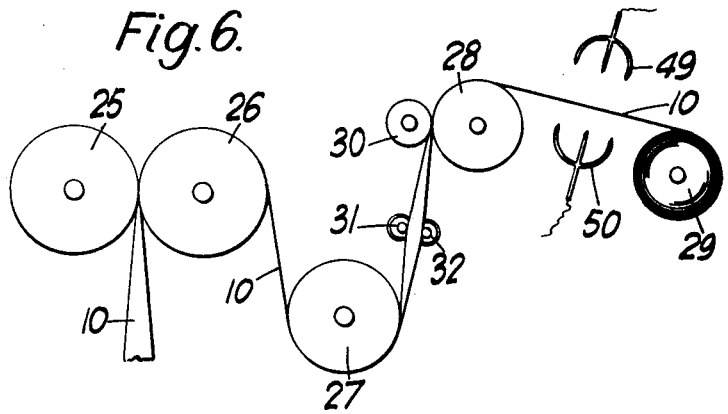
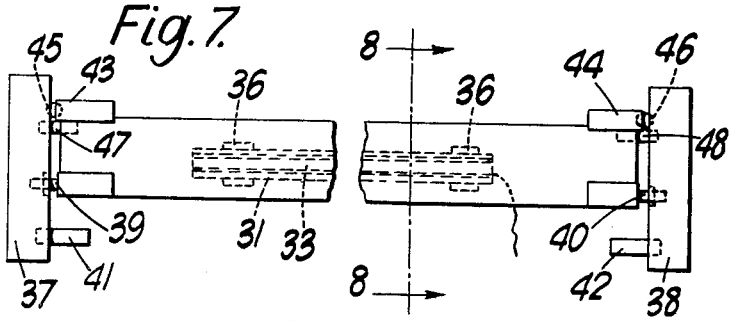
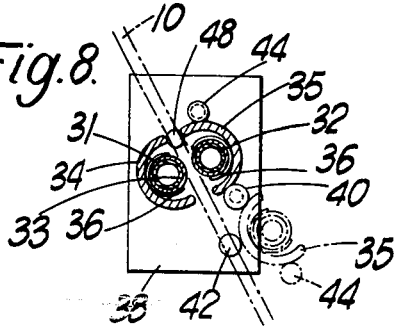

3,086,145
ANTISTATIC TREATMENT OF FLEXIBLE
TUBULAR FILMS
John Laurence Linsley Hood, Bridgwater, Somerset, England, assignor to British Cellophane Limited, Bridgwater, England, a British company
Filed May 25, 1960, Ser. No. 31,682
Claims priority, application Great Britain June 2, 1959
12 Claims. (Cl. 317—2)

This invention relates to the antistatic treatment of flexible tubular films.

Flexible tubular films of thermoplastic materials, such as polyethylene, are usually manufactured by a so-called "blow-extrusion" process in which the film-forming material in a heated molten state is extruded through an annular orifice to form a tube which is immediately expanded by a captive bubble of gas within the tube to stretch the wall to a desired thickness, followed by cooling the tube below the solidification temperature of the material and collapsing and drawing off the tube between a pair of rotating nip rollers which also serve as a gas-seal for the captive bubble of gas.

The collapsed tubular film, sometimes known as "lay-flat tubing," is then led around one or more guiding rollers to a wind-up roll where it is wound upon a core for despatch to the user.

There are many commercial uses for tubular film. It may be slit down one edge and opened up to form sheet film or it may readily be converted into bags on high-speed bag making machinery by transversely sealing the two opposing walls of the tubular film at predetermined intervals, followed by cutting transversely across the film near each seal in order to separate the individual bags.

Many of the materials from which flexible tubular film is made are susceptible to acquiring electrostatic charges and such charges may become apparent on the inner and outer surfaces of the tubular film during manufacture. The charges formed on the inner surfaces are particularly troublesome since by mutual attraction they cause the inner facing surfaces of the film to cling together with the result that difficulties are experienced in opening a tubular film after slitting to form a single sheet or opening a bag formed from the tubular film for the purpose of filling it. Even when the two walls of the tubular film have been separated, there is a distinct tendency for walls to spring back into contact once again.

The object of the present invention is substantially to eliminate electrostatic charges formed on the inner surface of tubular film of electrostatic charge-susceptible material.

According to the present invention, a process for the elimination of electrostatic charges from the inner surface of a flexible tubular film of an electrostatic charge-susceptible material comprises inflating the tubular film with a gaseous medium sufficient to expose substantially the entire inner surface of the tubular film to the gaseous medium and ionising the gaseous medium to such a degree that electrostatic charges present on the inner surface of the tubular film are electrically neutralised.

In a preferred form of the invention, the gaseous medium contained within the inflated tubular film is ionised by subjection to an electrostatic stress set up between a pair of electrodes placed adjacent to but preferably on either side of the tubular film and supplied with an alternating electric potential of magnitude capable of ionising the gaseous medium but not sufficient to give rise to a spark discharge between the electrodes.

The tubular film may conveniently be treated in a continuous manner by causing it to travel between a pair of stationary electrodes, the film being inflated in the region of the electrodes by a captive bubble of gaseous medium, for example air, trapped in the travelling tubular film between spaced rollers. The looping of the tubular film around a large arc of the circumference of the rollers may be sufficient to trap the captive bubble in the tubular film between the rollers. However, preferably the two spaced rollers are associated with further rollers, providing nip rollers, for preventing the escape of the gaseous medium from the bubble.

The electrodes may be of any convenient shape, but preferably they are rod-shaped and disposed transversely across the tubular film. The electrodes need not be insulated but to avoid the possibility of a spark discharge between them, particularly at the ends not shielded by the tubular film, it is preferable to coat or otherwise cover them with an electrically insulating material. A suitable insulated electrode for use in the present invention comprises a length of glass tubing coated on the inner surface with a layer of electrically conducting colloidal graphite.

The optimum results are obtained when the tubular film is in contact with the electrodes and preferably the tubular film is inflated to such an extent that, in the absence of the electrodes, it would adopt a diameter greater than the space between the electrodes, so that the electrodes form a constriction in the inflated tubular film and are, consequenly, partly enveloped by the film.

The alternating electric potential which is applied to the electrodes is kept to a minimum since with increasing potential there is an increasing tendency for the tubular film to cling to the electrodes, resulting in drag when the film is treated in a continuous manner.

Further, since the minimum electric potential required for effectively neutralising the electrostatic charges on the internal surfaces of the tubular film increases with increase of separation of the electrodes, it is preferable that the electrodes should be placed as close together as is practicable. A suitable spacing for the electrodes is between $\frac{1}{16}$ inch and $\frac{1}{4}$ inch.

The minimum effective electric potential required with any particular spacing of the electrodes, type of electrodes and thickness of insulation, if present, may be readily determined by passing a tubular film, having electrostatic charges on the internal surfaces and in an inflated state, between a pair of the electrodes to which an alternating electric potential is applied, the potential being gradually increased in a step-wise manner and the residual electrostatic charges on the internal surfaces of the treated film being determined at each step. The minimum effective electric potential will be the lowest potential at which the treated tubular film has no residual electrostatic charge on the internal surface.

Whether or not a length of tubular film has electrostatic charges on its internal surfaces can be roughly determined by taking a portion of the film in a collapsed state, removing any electrostatic charges on the outer surfaces by brushing with the hand or with a dampened cloth, or by any other known technique, and then opening the tube. Any tendency for the tubular film to spring back to the closed state indicates the presence of internal electrostatic charges.

A more effective method of determining the presence of internal electrostatic charges in tubular film is to cut a disc from the collapsed film and to measure the charge recorded by an electrostatic voltmeter when one layer of film is removed from the second layer of the double-layer disc.

In practice it is found that for electrodes consisting of thin-walled "Pyrex" (registered trademark) glass tubing, $\frac{1}{2}$ inch in diameter, coated on the inner surface with colloidal graphite to form an electrically conducting layer and placed about one tenth of an inch apart, a suitable alternating electric potential for bringing about the neutralisation of electrostatic charges on the internal surfaces of tubular film of polyethylene is of the order of 11 to 12 kilovolts (R.M.S.). For similar electrodes spaced one inch apart the alternating electric potential required to achieve the same results is of the order of 20 to 22 kilovolts. For electrodes consisting of brass rods, ½ inch in diameter, covered with a polyester film 0.005 inch in thickness and placed 1/10 inch apart, the suitable alternating electric potential is of the order of 9 to 10 kilovolts.

The method of neutralising electrostatic charges formed on the internal surfaces of tubular film in accordance with the present invention may conveniently be incorporated as a step in the continuous manufacture of such film while the film is passing in a continuous manner from tubular film collapsing rollers of a tubular film extrusion device to a take-up roller. The best results may be achieved if the method is carried out just prior to the film being wound into a roll for supply to the user since it is believed that a tubular film acquires electrostatic charges on its internal surfaces during handling in the flattened or layflat state when one internal surface rubs in contact with the other surface.

If required, however, the neutralisation of the internal electrostatic charges may be carried out as an independent operation as the tubular film is wound from one roll to another.

Where a captive bubble of a gaseous medium, conveniently air, is used to inflate the tubular film, the air may initially be introduced into the tubular film by way of a hollow needle, or through a free end of the film when the nip-rollers are temporarily released. In the case in which the method in accordance with the present invention is an additional step in the continuous manufacture of tubular film by a blow-extrusion process, the captive bubble of air may be acquired by easing temporarily the collapsing nip rollers at the blow-extrusion station and allowing some air to escape from the captive bubble employed for expanding the molten tube to the station at which the neutralisation of the internal electrostatic charges is carried out.

When freshly extruded blown tubular film is collapsed at the collapsing rollers, creases are formed at the edges of the collapsed film. Similarly, in the production of gussetted tubular film, commonly formed by a pair of gussetting members placed each side of a freshly extruded blown tubular film just prior to the collapsing rollers to push inwardly two opposing portions of the film to form re-entrants or gussets in the collapsed film, the edges of the gussets are creased. When such creased film is inflated for the purpose of the present invention and then subsequently deflated, there is a possibility that the tubular film will not collapse upon the previously formed creases. Such a possibility may be avoided by providing in the neighbourhood of the electrodes one or more pairs of nip rollers which grip the creased edges of the tubular film at spaced intervals during the inflation of the tubular film.

In the continuous manufacture of tubular film, such as polyethylene tubular film, foreign matter such as lumps of the film forming material are occasionally picked up from the face of the die and are entrained with the film. Where such lumps are of a size greater than the width of the gap between the electrodes there is a possibility of damage to the electrode or to the film. Such damage may be avoided by the provision of a detecting member which on detecting the entrainment of such foreign matter causes the electrodes to spring apart. Preferably, the detecting member comprises a pair of spaced supports each supporting an electrode and defining a gap through which the tubular film passes prior to passing between the electrodes, at least one of the supports being adapted to swing away from the other member carrying its associated electrode when foreign matter, entrained by the tubular film and of a size in excess of the width of the gap, presses against the support.

If desired, any electrostatic charges occurring on the outer surface of the tubular film may be neutralised by one of the conventional static eliminators either before or after the treatment of the film in accordance with the invention.

Four examples, by way of illustration, of ways of carrying out the method in accordance with the invention are now described with reference to the accompanying diagrammatic drawings in which, FIGURE 1 is a side elevation of one form of treatment apparatus, FIGURE 2 is a plan of FIGURE 1, FIGURE 3 is a side elevation of an apparatus for the continuous production of tubular film incorporating the treatment apparatus, FIGURE 4 is a plan view of a modification of a part of the apparatus shown in FIGURE 3, and FIGURE 5 is a sectional view of FIGURE 4 through line 5—5.

FIGURE 6 is a side elevation of a further apparatus for the continuous production of tubular film incorporating the treatment apparatus.

FIGURE 7 is a front elevation of a part of FIGURE 6, and

FIGURE 8 is a section taken through line 8—8 of FIGURE 7.

EXAMPLE 1

Referring to FIGURES 1 and 2, a lay-flat tubular film 1 of polyethylene having electrostatic charges on the internal surfaces of the film 1, as was indicated by a distinct tendency for the film 1 to spring back into the closed position when opened by hand and released, was led from a supply roll 2 through two pairs of spaced nip rollers 3, 4 to a driven wind-up roll 5.

The film 1 was 9 inches in width (in the lay-flat state) and had a wall thickness of 0.0013 inch. Between the spaced nip rollers 3, 4 were placed a pair of electrodes 6, transversely across the film 1, and spaced 1/10 of an inch apart, between which the film 1 was passed.

The electrodes 6 consisted of thin-walled "Pyrex" (registered trademark) glass tubing, ½ inch in diameter and coated on the inner surface with colloidal graphite to form an electrically conducting layer; the glass envelope forming an electrically insulating layer for the conducting layer.

The section of film 1 between the spaced nip rollers 3, 4 was inflated with air sufficient to separate the internal surfaces of the film 1 and to cause the walls of the film 1 partly to envelope the electrodes 6, by blowing air through the free end of the tubular film 1 while temporarily releasing the pressure between the nip-rollers 4.

A measure of the electrostatic charge present on the internal surfaces of the tubular film 1 passing the rollers 4 was then obtained in the following manner:

A disc, 5 inches in diameter was cut from the film 1 in the section between the rollers 4 and the roll 5. This disc, consisting of two layers, in close contact, was laid on a horizontal aluminium plate connected to the terminal of an electrostatic voltmeter capable of reading from 0 to 5 kilovolts on a non-linear scale. The plate was insulated from earth. The second terminal of the electrostatic voltmeter was connected to earth. For convenience of reading, the scale of the voltmeter was recalibrated to read from 0 to 30 units on a linear scale.

The upper layer of the double-layer disc lying on the plate was then stripped from the lower layer, which remained in contact with the plate, by means of a pair of insulated tweezers, when the needle of the voltmeter swung over the scale to give a reading which was a measure of the electrostatic charge present between the two layers of film forming the double-layer disc. The procedure was repeated twice with new discs cut from the film 1 and a mean reading of 9.7 units was obtained.

An alternating voltage (50 cycles per second) of value 7.6 kilovolts was then applied to the electrodes 6 by way of a supply line 7 from a source 8 and the film 1 was drawn from the roll 2 by the roll 5 at a speed of 20 feet per minute. The bubble of air held captive between the rollers 3, 4 served to inflate successive lengths of the travelling film 1.

Sample discs were cut from the film 1 as before and the residual electrostatic charges measured exactly in accordance with the procedure described above.

The entire procedure was repeated with increasing voltages applied to the electrodes 6 until the measurements indicated that the disc samples had no residual electrostatic charges. The results obtained are shown in the following Table 1.

*Table 1*

| Alternating Voltage applied to Electrodes (Kilovolts) | Meter Readings (indicating residual electrostatic charges between film layers in sample discs) | Mean |
| --- | --- | --- |
| 0 | 7, 13, 9 | 9.7 |
| 7.6 | 1, 2.2, 1.6 | 1.6 |
| 8.6 | 0.25, 0.8 | 0.5 |
| 9.6 | 0.1, 0.5 | 0.3 |
| 11.3 | 0.0, 0.3 | 0.15 |
| 12.8 | 0.0, 0.0 | 0. |

The results showed that when an alternating voltage of about 12 kilovolts was applied to the electrodes 6, the air within the bubble of gas was ionised sufficiently to neutralise the electrostatic charges present on the internal surfaces of the film 1.

The tubular film 1 on the roll 2 was then treated in a continuous manner as described employing an alternating voltage of 12 kilovolts applied to the electrodes 6.

The treated film 1, when freed of any electrostatic charges on the external surfaces by smoothing by hand or treatment with any of the known static eliminators was found to open easily and to show no tendency to spring back to the closed position. Bags made from the film 1 on standard bag-making machinery were readily opened and remained opened thus facilitating filling with goods.

EXAMPLE 2

Referring to FIGURE 3, a tubular film 10 of polyethylene was manufactured by extruding molten polyethylene through an annular orifice 11 having a diameter of 4 inches, in a die 12 and inflating a tube 13, so formed, by a captive bubble 14 of air within the tube 13. The expanding tube 13 was cooled by a ring of air jets directed from an annular air supply member 15 placed near the die 12 to cool the polyethylene below its solidification temperature and thus arrest further expansion by inflation. The cooled film 10 was then drawn continuously away from the die 12 and collapsed between a pair of rotating nip rollers 16. The air bubbles 14, initially introduced through the pipe 17, was held trapped within the tube 10 between the rollers 16 and the die 12 and served to inflate successive lengths of tube 13. The conditions of inflation and cooling were so chosen that the tubular film 10 had a wall thickness of 0.0012 inch and a width, in the collapsed state, of 9 inches.

The collapsed film 10 was passed between a pair of conventional static eliminators 18, 19 to neutralise any electrostatic charges present on the outer surface of the film 10 and was then passed between two suitably spaced pairs of nip-rollers 20, 21 before finally being wound upon a driven roll 22 at a speed of 60 feet per minute. Between the rollers 20, 21 the film 10 was again inflated to an extent sufficient to separate substantially the inner surfaces and was passed between and in contact with a pair of electrodes 22 placed 1/10 inch apart.

The electrodes 22 consisted of brass tubing 1/2 inch in diameter and wrapped with a polyester film 0.005 inch thick and were connected to an alternating voltage source (50 cycles per second) of 9 kilovolts. The electrodes 22 formed a constriction in the film 10 such that the film 10 partly enveloped the electrodes 22.

At the start of the operation, the film 10 between the nip rollers 20, 21 was inflated to the desired extent by temporarily releasing the pressure of the nip rollers 16 and 20 sufficiently to permit some air to escape from the air bubble 14 to the portion of the film 10 passing between the rollers 20, 21.

The tubular film 10 wound upon the roll 22 was found to be entirely free from electrostatic charges and could be readily opened without any tendency for the film 10 to spring back to the collapsed state.

By way of control, the continuous manufacture of tubular film 10 was repeated in the absence of a potential applied to the electrodes 22. The resulting film 10 was difficult to open and, on being released, it sprung back to the collapsed state.

EXAMPLE 3

The process described in Example 2 with reference to FIGURE 3 was repeated with the additional operation of inserting two pleats or gussets at diametrically opposed points in the tubular film 10 just prior to collapsing at rollers 16 by means of a pair of conventional gussetting members (not shown).

During the passage of the gussetted tubular film 23 between the nip rollers 20, 21 (FIGURES 4 and 5) the extreme edges of the film 23 were held between pairs of gripping rollers 24 to ensure that on collapsing of the film at the nip rollers 21, the film 23 would collapse accurately upon the creases of the gussets.

The gripping rollers 24 were "toed-out" to a small degree to overcome any tendency for the inflated film to wrinkle on passage through the rollers 24.

EXAMPLE 4

The process described in Example 2 with reference to FIGURE 3 was repeated with the apparatus illustrated in FIGURES 6, 7 and 8.

The cooled inflated tubular film 10 of polyethylene was collapsed between a pair of rotating nip rollers 25, 26 consisting of a driven steel roller 26, and a non-driven backing roller 25, passed into contact with the roller 26.

The collapsed tubular film 10 was then led round a non-driven steel guiding roller 27, over a driven steel guiding roller 28 and was wound up upon a take-up roller 29.

A captive bubble of air was initially introduced into the portion of the tubular film 10 passing between the rollers 27, 28 and served to inflate successive lengths of the tubular film 10. A rubber backing roller 30, pressed into contact with the roller 28, collapsed the inflated film 10 on reaching the roller 28 and prevented the loss of air from the captive bubble.

Stationed between the rollers 27, 28 were a pair of electrodes 31, 32, placed 1/16 of an inch apart, between which the inflated film 10 was caused to pass. The inflation of the film 10 was such that the walls of the film 10 made contact with an arc of the electrodes 31, 32 on passage through the zone.

The electrodes 31, 32 (FIGURES 7 and 8) consisted of thin-walled "Pyrex" (registered trademark) glass tubing, 1/2 inch in diameter and coated on the inner surface with colloidal graphite to form an electrically conducting layer 33. The electrodes 31, 32 were held in metal channel members 34, 35 by clips 36 and the members 34, 35 were supported by end plates 37, 38. The channel member 34 was securely fixed to the plates 37, 38 at both ends but the channel member 35 was pivoted by its lower end to the plates 37, 38 by pivots 39, 40 and was prevented from falling back to stops 41, 42 by ball-catches 43, 44 engaging recesses 45, 46 in the plates 37, 38. The "fall-back" or open position of the electrode 32 with its associated channel member 35 is shown in dotted outline in FIGURE 8. Stop members 47, 48 were provided to prevent the member 35 being pushed beyond the ball catch position. The lower ends of the channel members 34, 35 were separated by a distance of 3/16 of an inch.

With this arrangement for the support of the electrodes 31, 32 any lumps of polyethylene or other foreign matter carried by the tubular film 10 likely to block the gap between the electrodes 31, 32 would catch the edge of the channel member 35, causing the release of the ball-catches 43, 44 and the fall back of the member 35 together with the electrode 32, thus opening the gap between the electrodes 31, 32 and warning the operator of the presence of undesirable foreign matter carried by the tubular film 10.

In operation, the electrically conducting layers of the electrodes 31, 32 were connected to an alternating voltage source (50 cycles per second) of 12 kilovolts.

Any static charge carried on the surface of the tubular film 10 was removed by conventional static eliminators 49, 50 just prior to take-up on the roller 29.

The tubular film 10 wound upon the roller 29 was found to be entirely free from electrostatic charges and could readily be opened without any tendency for the film 10 to spring back to the collapsed state.

By way of control, the continuous manufacture of tubular film was repeated in the absence of a potential applied to the electrodes 31, 32. The resulting film 10 wound on the roller 29 was difficult to open and on being opened and released, it sprang back to the collapsed state.

In cases where there is undesirable cling of the tubular film to the electrodes due to the necessity to use high voltages, the drag effect upon the tubular film may be reduced by providing freely rotating electrodes or fixed electrodes having freely rotatable electrically insulating sleeves.

Although in the examples reference has only been made to the manufacture of polyethylene tubular film, the invention is applicable to flexible tubular films of other electrostatic charge-susceptible materials such as polyamides, polyesters, cellulose acetate, polystyrene, polyvinylidene chloride, polyvinyl chloride, polycarbonates or similar highly electrically insulating materials.

Means other than electrodes placed each side of the inflated tubular film may be employed to produce an electrostatic stress in the gaseous medium within the film. A pair of electrodes may be placed side by side on one side of the inflated film or the electrodes may comprise a series of discrete spaced elements or points placed on one or both sides of the inflated film. Further, a single electrode supplied with an intermittent high potential from a conventional "Tesla" coil may be used in close proximity to or in contact with the inflated film.

Means other than electrostatic fields may be employed to ionise the gaseous medium within the inflated film, for example high energy ultra violet light, X-ray radiation, bombardment with high energy particles or radio frequency electrical excitation such as is obtained from a slot in a wave guide or at some discontinuity in a radio frequency transmission line.

I claim:
1. A process for the substantial elimination of electrostatic charges from the inner surface of a flexible tubular film of an electrostatic charge susceptible material which process comprises inflating the tubular film with a gaseous medium sufficient to separate contacting portions of the inner surface of the tubular film and to expose substantially the entire inner surface of the tubular film to the gaseous medium and ionising the gaseous medium to such a degree that electrostatic charges present on the inner surface of the tubular film are substantially electrically neutralised.

2. A process as claimed in claim 1 in which the gaseous medium is ionized by subjection to an electrostatic stress set up between a pair of spaced electrodes placed on each side of the tubular film and supplied with an alternating electric potential of a magnitude capable of ionising the gaseous medium to such a degree that electrostatic charges present on the inner surface of the tubular film are electrically neutralised but not sufficient to give rise to a spark discharge between the electrodes, the tubular film being inflated to such an extent that in the absence of the electrodes it would adopt a diameter greater than the space between the electrodes whereby the electrodes are in contact with and are partly enveloped by the tubular film.

3. A process as claimed in claim 1 in which the tubular film is treated in a continuous manner while passing it between two spaced rollers in which region it is inflated by a captive bubble of the gaseous medium trapped in the tubular film between the spaced rollers.

4. A process as claimed in claim 3 in which the tubular film is treated while passing in a continuous manner from tubular film collapsing rollers of a tubular film extrusion device to a take-up roller and just prior to being wound upon the take-up roller.

5. A process as claimed in claim 4 in which the creased edges of the tubular film are gripped at spaced intervals by at least one pair of nip rollers during the period the film is inflated by the gaseous medium.

6. A process as claimed in claim 5 in which the tubular film is gussetted.

7. A process as claimed in claim 1 in which the tubular film is of polyethylene.

8. Apparatus for the substantial elimination of electrostatic charges from the inner surface of a travelling flexible tubular film of an electrostatic charge susceptible material which apparatus comprises a pair of spaced rollers between which the tubular film is passed, trapping means for trapping a captive bubble of a gaseous medium within the tubular film between the rollers, a pair of spaced electrodes placed adjacent to the path of the inflated tubular film and a source of an alternating electric potential connected to the electrodes for setting up an electrostatic stress between the electrodes of such magnitude that the gaseous medium within the tubular film is ionised to such a degree that electrostatic charges present on the inner surface of the tubular film are substantially electrically neutralised but not sufficient to give rise to a spark discharge between the electrodes.

9. Apparatus as claimed in claim 8 in which the tubular film passes between the electrodes and the electrodes are rods coated with an electrically insulating material and are disposed transversely across the inflated tubular film.

10. Apparatus as claimed in claim 9 in which each electrode comprises a length of glass tubing coated on the inner surface with a layer of electrically conducting colloidal graphite and the space between the electrodes lies in the range between 1/16 and 1/4 inch.

11. Apparatus as claimed in claim 9 including a detecting member associated with the electrodes wherein the detecting member on detecting the entrainment of oversize matter by the tubular film causes the electrodes to spring apart.

12. Apparatus as claimed in claim 11 in which the detecting member comprises a pair of spaced supports each supporting an electrode and defining a gap through which the tubular film passes prior to passing between the electrodes, at least one of the supports being adapted to swing away from the other member carrying its associated electrode when matter of a size in excess of the width of the gap presses against the support.

References Cited in the file of this patent
UNITED STATES PATENTS

| | | |
|---|---|---|
| 1,731,030 | Thompson | Oct. 8, 1929 |
| 1,766,512 | Hausmann | June 24, 1930 |
| 2,207,677 | Chapman | July 9, 1940 |

FOREIGN PATENTS

| | | |
|---|---|---|
| 476,436 | Great Britain | Dec. 8, 1937 |